(Model.)
L. BROWNLOW.
COLANDER AND FRUIT PRESS COMBINED.
No. 258,707. Patented May 30, 1882.
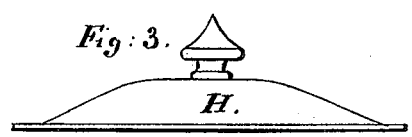
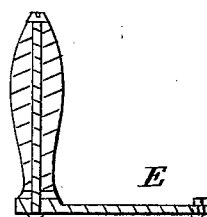
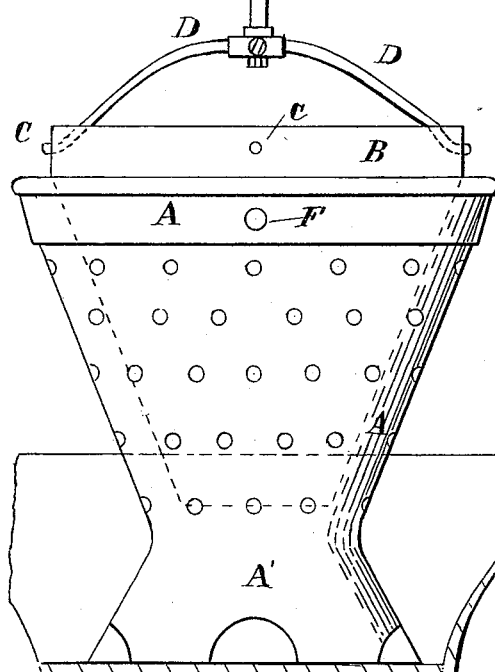
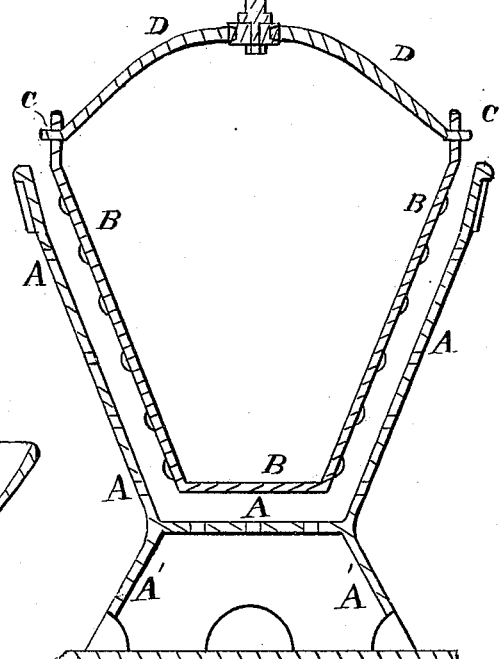
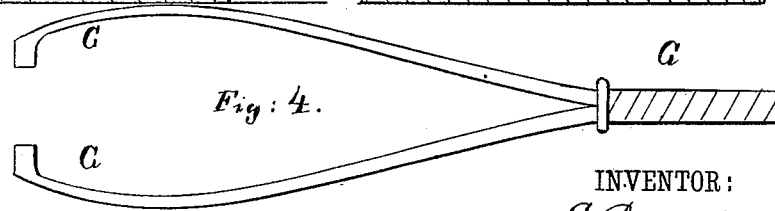
WITNESSES:
INVENTOR:
L. Brownlow
BY
ATTORNEYS.

UNITED STATES PATENT OFFICE.

LORETTA BROWNLOW, OF EAST PAW PAW, ILLINOIS.

COLANDER AND FRUIT-PRESS COMBINED.

SPECIFICATION forming part of Letters Patent No. 258,707, dated May 30, 1882.

Application filed March 18, 1882. (Model.)

*To all whom it may concern:*

Be it known that I, LORETTA BROWNLOW, of East Paw Paw, De Kalb county, Illinois, have invented a new and useful Improvement in Colander Fruit-Presses, of which the following is a full, clear, and exact description.

Reference is to be had to the accompanying drawings, forming part of this specification, in which similar letters of reference indicate corresponding parts in all the figures.

Figure 1 is a side elevation of my improvement. Fig. 2 is a sectional side elevation of the same. Fig. 3 is a side elevation of the cover, and Fig. 4 is a plan view of the tongs.

The object of this invention is to provide a simple and convenient means for crushing and straining fruit in making jelly and jam, for washing dried fruit, and for other purposes.

The invention consists in a colander fruit-press constructed with an outer perforated vessel provided with tongs for holding it stationary, and the similarly-shaped inner vessel, having a roughened outer surface, and provided with a spider and crank for operating it, whereby fruit can be crushed between the two vessels and pressed and strained through the perforations of the outer vessel, as will be hereinafter fully described.

A represents the outer vessel or colander, which is made of earthenware or other suitable material, and has numerous small perforations formed through it. The vessel A is made with less flare than an ordinary colander, and is provided with a perforated or notched foot, A', as shown in Figs. 1 and 2.

B is the inner vessel or presser, which is made of the same shape and material as the outer vessel, A, but smaller, so that it will fit into the said outer vessel, A. The vessel B is made without a foot, and has numerous small projections formed upon its outer surface, to better adapt it to produce a rubbing effect upon the fruit or other substance placed in the vessel A. In the rim of the inner vessel, B, are formed four holes, C, to receive the arms of a spider, D, which are made with a downward and outward bend, as shown in Figs. 1 and 2, so that they can be readily sprung into and out of the holes C.

To the center of the spider D is attached a crank, E, so that the said inner vessel or press can be readily turned within the outer vessel or colander, A, to crush the fruit and press it through the perforations of the said vessel A. In the opposite sides of the rim of the outer vessel, A, are formed holes F, to receive the inwardly-projecting ends or points of the tongs G. The arms of the tongs G are formed in such a shape that the said tongs will about fit into the interior of the vessel A, so that they can be used as a stirrer when washing dried fruit or other substance in the outer vessel, A. The arms of the tongs G should have sufficient elasticity to allow the ends of the said arms to be readily sprung into the holes F in the rim of the vessel A. The arms of the tongs G should be made of such a length that the handle of the said tongs will rest upon the table while the ends of the arms are in the holes F, so that the said tongs can be used for holding the outer vessel, A, firmly in place while the inner vessel is being turned by the crank E.

H is a cover, which fits into the mouth of the inner vessel, B, to adapt the said vessel B to be used in a vessel of boiling water for cooking rice, puddings, and other substances that are liable to be burned or scorched.

Having thus described my invention, I claim as new and desire to secure by Letters Patent—

1. A colander fruit-press constructed substantially as herein shown and described, and consisting of the outer perforated vessel, A, the similarly-shaped inner vessel, B, having roughened outer surface, the spider and crank D E, and the tongs G, as set forth.

2. In a colander fruit-press, the combination, with the outer perforated vessel, A, of the inner similarly-shaped vessel, B, having a roughened outer surface, substantially as herein shown and described, whereby the fruit can be crushed between the two vessels and pressed and strained through the perforations of the outer vessel, as set forth.

3. In a colander fruit-press, the combination, with the inner vessel, B, of the spider D and crank E, substantially as herein shown and described, whereby the said inner vessel can be readily turned within the outer vessel, as set forth.

4. In a colander fruit-press, the combination, with the perforated outer vessel, A, of the tongs G, substantially as herein described, whereby the said outer vessel can be held stationary while the inner vessel is being operated, as set forth.

LORETTA BROWNLOW.

Witnesses:
HENRY A. VAN RIPER,
HENRY S. DICKINSON.